United States Patent
Freeman et al.

(10) Patent No.: US 6,605,309 B2
(45) Date of Patent: Aug. 12, 2003

(54) FOOD COMPOSITION

(75) Inventors: Mark D. Freeman, Lititz, PA (US); Krista L. Ditzler, Fredricksburg, PA (US); John J. Urbanski, Lancaster, PA (US); Katy J. Dishart, Lititz, PA (US); Richard A. Schwartz, Lititz, PA (US); Robert E. Wainwright, Matthews, NC (US)

(73) Assignee: Cargill, Inc., Wayzata, MN (US)

( * ) Notice: Subject to any disclaimer, the term of this patent is extended or adjusted under 35 U.S.C. 154(b) by 0 days.

(21) Appl. No.: 09/888,343

(22) Filed: Jun. 22, 2001

(65) Prior Publication Data

US 2003/0026890 A1 Feb. 6, 2003

(51) Int. Cl.⁷ ................................................. A23D 9/00
(52) U.S. Cl. ..................... 426/607; 426/613; 426/658; 426/417
(58) Field of Search ............................... 426/601, 604, 426/613, 607, 658, 417, 633

(56) References Cited

U.S. PATENT DOCUMENTS

| | | |
|---|---|---|
| 2,952,544 A | 9/1960 | Durst et al. |
| 3,431,112 A | 3/1969 | Durst et al. |
| 3,719,497 A | 3/1973 | Galle et al. .................... 99/14 |
| 3,872,229 A | 3/1975 | Durst et al. ................... 426/62 |
| 3,872,230 A | 3/1975 | Sinner et al. ................. 426/98 |
| 3,947,599 A | 3/1976 | Mitchell, Jr. ................ 426/250 |
| 4,119,740 A | 10/1978 | Crespo ........................ 426/631 |
| 4,217,369 A | 8/1980 | Durst ........................... 426/98 |
| 4,235,939 A | 11/1980 | Kimberly, Sr. ............... 426/549 |
| 4,364,967 A | 12/1982 | Black ........................... 426/632 |
| 5,403,601 A | 4/1995 | Komai et al. ................. 426/98 |
| 5,439,697 A | 8/1995 | Gonzalez-Sanz |
| 5,676,993 A | 10/1997 | Watterson et al. |
| 5,762,990 A | 6/1998 | Wada et al. ................. 426/633 |
| 5,942,275 A | 8/1999 | Wong et al. ................. 426/631 |
| 6,010,737 A | 1/2000 | Meade |
| 6,238,926 B1 | 5/2001 | Liu et al. |
| 6,447,833 B1 | 9/2002 | Widlak |
| 2002/0037355 A1 * | 3/2002 | Wong et al. ................. 426/633 |
| 2002/0037356 A1 * | 3/2002 | Wong et al. ................. 426/633 |
| 2002/0071898 A1 * | 6/2002 | Trout et al. ................. 426/607 |

FOREIGN PATENT DOCUMENTS

| | | |
|---|---|---|
| CA | 1016398 | 8/1977 |
| JP | 5-276903 | 10/1993 |

OTHER PUBLICATIONS

Aarhus Inc., Nutritional Data (available at least by Jun. 12, 2001) (5 sheets).

Aarhus Inc., Product Data Sheet regarding *Cebes® 21–10* (available at least by Jun. 8, 2001) (1 sheet).

Aarhus Inc., Cebes® Product Line, available at http://www.aarhususa.com/products.htm, ® 2000 Aarhus Inc. (1 page).

Akzo Nobel, Creating the right chemistry, available at http://www.geocities.com/CapeCanaveral/4610/fatty-acid.htm, (available at least by Jun. 8, 2001) (1 page).

(List continued on next page.)

*Primary Examiner*—Nina Bhat
(74) *Attorney, Agent, or Firm*—Foley & Lardner

(57) ABSTRACT

Food compositions including a triacylglycerol component and a bulking agent are provided. The triacylglycerol component typically forms about 20 to 35 wt. % of the food composition. The triacylglycerol component can be formed by combining a lauric triacylglycerol with a saturated 16/18 triacylglycerol. The triacylglycerol component can be characterized by its fatty acid composition, which typically includes at least about 30 wt. % lauric acid and at least about 10 wt. % total of palmitic acid and stearic acid. Methods for making the food compositions and food products incorporating the food compositions are also provided.

35 Claims, 2 Drawing Sheets

OTHER PUBLICATIONS

Loders Croklaan, Data Sheet regarding COTE HI STEARINE High Perfromance Structuring System for Oil Separation Inhibtion (available at least by Jun. 8, 2001) (1 sheet).

Noller, Chemistry of Organic Compounds, *W. B. Saunders Company*, (1957) (p. 181).

Pantzaris et al., "Palm Kernel Oil", *Palm Oil Research Institute of Malaysia* (*PORIM Europe*), (available at least by Jun. 20, 20001) (3 pages).

Website page regarding Processing Palm Kernel Oil for CBSs, available at http://sci.mond.org/lps, (available at least by Jun. 20, 2001) (1 page).

Technical Information Flavors of North America, Inc., Allergen Review (available at least by Jun. 8, 2001) (1 sheet).

* cited by examiner

FOOD COMPOSITION

BACKGROUND

Nuts have been used as a food source for thousands of years. During this time, the popularity of nuts as a food source can be attributed, at least in part, to their pleasing taste and nutritional value. Nuts are also recognized as being a good source of protein.

Nuts are currently used in many different food products to add flavor and variety. Products such as ice cream, chocolates, cookies, etc., are more appealing when eaten in combination with nuts such as peanuts, macadamia nuts, walnuts, pistachios, cashews, almonds, brazil nuts and the like. Accordingly, there is strong demand for these types of nuts.

Unfortunately, nuts have many disadvantages. Nuts are expensive, and the cost of a food product incorporating nuts increases accordingly. Nuts may contain aflatoxins, a toxic, naturally occurring mycotoxin produced by mold that may grow on the nuts. Many of the aflatoxins are thought to be carcinogenic to humans. In addition, some nuts contain potential allergens that when ingested can cause a severe reaction and possibly death. Accordingly, it would be advantageous to develop a simulated nut-like product that minimizes or eliminates many of these disadvantages while preserving the advantages of nuts.

Over the years, attempts have been made to produce a nut-like substitute for use in food products. However, many of these attempts were unsatisfactory because the nut-like substitute did not possess the necessary texture, bite, taste, or look of natural nuts. Nuts are often incorporated into products that must be cooked or baked such as cookies, brownies, muffins, pies, butterscotch, breads, cakes, etc. Many of the nut-like substitutes, however, cannot withstand the high temperatures involved in cooking or baking without losing some of their nut-like characteristics.

SUMMARY

The present invention relates generally to food compositions and methods for making food compositions, and more particularly to nut-like food compositions and methods for making nut-like food compositions. The present nut-like food compositions include a triacylglycerol component and a bulking agent. The triacylglycerol component normally forms about 20 to 35 wt. % (all percents are in weight unless specified otherwise) of the resulting food composition. The triacylglycerol component can be formed by combining a lauric triacylglycerol with a saturated 16/18 triacylglycerol. Alternatively, any suitable method can be used to provide a triacylglycerol component having a fatty acid composition including at least about 30 wt. % of lauric acid and at least about 10 wt. % total of palmitic acid and stearic acid. The bulking agent used in the food composition can include any nutritive or non-nutritive agent added to increase the volume and bulk of the composition.

As referred to herein, a "lauric triacylglycerol" is a triacylglycerol having a fatty acid composition which includes at least about 35 wt. % lauric acid. A "saturated 16/18 triacylglycerol," as used herein, is a triacylglycerol having a fatty acid composition including at least about 95 wt. % total of palmitic acid and stearic acid. Saturated 16/18 triacylglycerols typically have an Iodine Value of no more than about 5. Iodine Value is one measure for characterizing the average number of double bonds present in a triacylglycerol stock which includes triacylglycerol molecules with unsaturated fatty acid residues. The Iodine Value of a triacylglycerol or mixture of triacylglycerols is determined by the Wijs method (A.O.C.S. Cd 1-25).

One embodiment of the present nut-like food composition includes a bulking agent combined with a triacylglycerol component which includes at least about 75 wt. % of a lauric triacylglycerol and about 1 to 10 wt. % of a saturated 16/18 triacylglycerol. The nut-like food composition may also include other ingredients such as flavoring(s), emulsifier, and/or colorant(s).

Another embodiment of the present nut-like food composition includes a bulking agent combined with a triacylglycerol component which has a fatty acid composition including at least about 30 wt. % lauric acid and at least about 10 wt. % total of palmitic and stearic acid. This embodiment of the nut-like food composition may also include other ingredients such as flavoring(s), salt, emulsifier and/or colorant(s). The bulking agent typically includes a saccharide component and may also include nonfat milk solids.

Food products which include the nut-like food composition are also provided herein. Muffins, cakes, cookie, brownie, fudge, pies, bar desserts, soft pretzels and ice cream are examples of food products which can include the present nut-like food composition. Typically, the food products include a form of the nut-like food composition which has been processed to a hardness characterized by a maximum penetration force of at least about 2,000 g and, more desirably, about 2,500 g to 6,000 g. This may be achieved by heating an unbaked form of the food product which includes the nut-like food composition for a sufficient time and temperature to harden the nut-like food composition to the desired degree. A paste form of the nut-like food composition may also be formed into bars or pieces (e.g., chips or drops) and heated to harden the nut-like food composition. The hardened bars or pieces can then be comminuted, such as by grinding, chopping and/or crushing, into smaller particles (e.g., circa 5,000 to 10,000 count/lb). The resulting particles of the hardened nut-like food composition can be incorporated into and/or distributed on food products.

A method for making a nut-like food composition is also provided herein. The method for making the triacylglycerol typically includes combining a first triacylglycerol component with the bulking agent to form a first paste. The first paste is then comminuted (e.g., via grinding, chopping and/or crushing) to form a material having particles about 100 microns in size or less (more desirably having particles no more than about 50 microns in size). In a particularly suitable embodiment, the nut-like food composition is processed to produce a material composed of particles about 15 to 50 microns in size. The comminuted material is then combined with a second triacylglycerol to form a second paste. The second paste desirably has a Macmichael viscosity at 120° F. of about 30 to 60 cP. Typically, the second paste is formed into drops or chips (e.g., about 500 to 10,000 count/lb in size) and cooled to ambient temperature. The drops or chips may be blended into a food composition (e.g., a cookie dough or a cake batter) which is then baked. The baking step can increase the hardness of the nut-like food composition, e.g., can convert the nut-like food composition to a form which has a maximum penetration force of at least about 2,500 g and, preferably, no more than about 10,000 g.

The nut-like food composition can also be produced using a method which includes at least the following steps. A first triacylglycerol component, typically including at least about 60 wt. % of a lauric oil, is mixed with a bulking agent to form a first paste. The first paste is then compressed to form a flake material, generally composed of particles of no more than about 50 microns in size. The flake material is then combined with additional lauric triacylglycerol to form a second paste, desirably having a Macmichael viscosity at 120° F. of about 30 to 60 cP.

DETAILED DESCRIPTION

Figure 1:
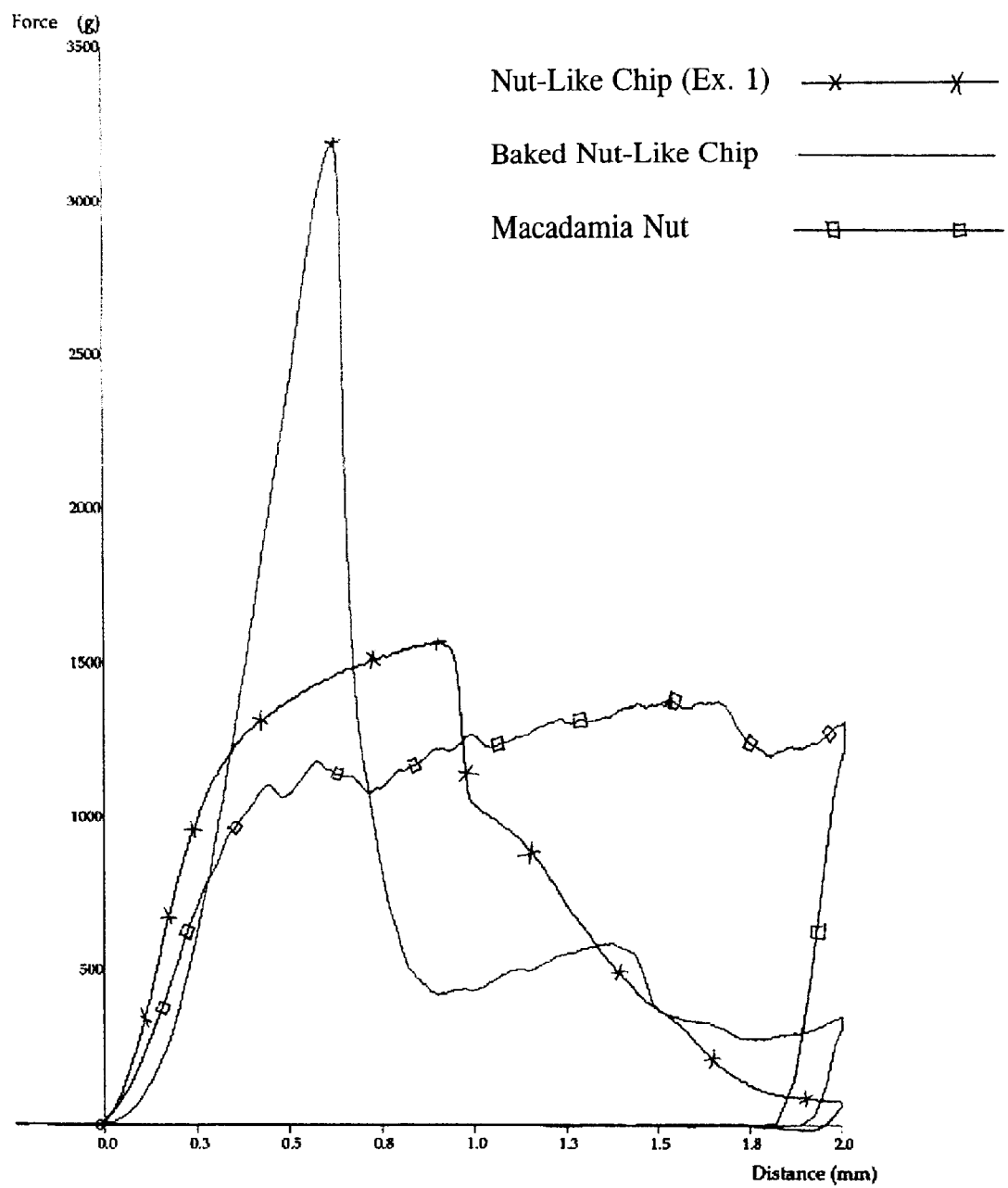
FIG. 1 shows a graph of the probe force (in grams) as a function of penetration distance from a texture analysis (in a penetrometer configuration) for a macadamia nut, a nut-like food composition prepared according to Example 1, and a baked form of the same nut-like food composition.

An exemplary nut-like food composition, food products containing the nut-like food composition, and methods for producing the same are described herein. A desirable advantage of the present nut-like food composition is that it may be safer for human consumption than food products containing nuts. This can be accomplished using the present nut-like food composition by using little, if any, materials from nuts in the food composition and/or in food products which include the nut-like food composition. The resulting food composition would thus commonly be free of allergens that can cause allergic reactions as well as potentially carcinogenic aflatoxins. Many people that were previously unable or unwilling to eat products containing nuts could eat the present nut-like food compositions and food products. Also, the risk of a potentially deadly allergic reaction could be greatly reduced.

The present nut-like food compositions include a bulking agent, which commonly includes a saccharide component, and a triacylglycerol component, which typically includes a lauric triacylglycerol. The triacylglycerol component generally has a melting point of about 100 to 110° F., and more desirably of about 102 to 107° F. (unless otherwise specifically noted herein, all melting point determinations were carried out by the mettler drop point method). The amounts and nature of the bulking agent, triacylglycerol component and any other additives are commonly chosen so that after being blended together the resulting nut-like food composition has a melting point of about 100 to 110° F. and, more desirably, about 102 to 107° F.

To facilitate processing, the present nut-like food compositions are desirably formulated to have a Macmichael viscosity at 120° F. of about 30 to 60 cP and, more desirably, about 45 to 60 cP. Compositions formulated to have a Macmichael viscosity at 120° F. of about 50 to 55 cP are particularly suitable examples of the present nut-like food compositions. If desired, the nut-like food composition can be formed into material having a particular shape and size. For example, while still somewhat warm (e.g., at about 120° F. or above) and in paste form, the present nut-like food composition can be formed into drops or chips of about 500 to 2,000 count/lb in size. The shaped material is generally cooled to ambient temperature for storage.

The nut-like food composition (e.g., in the form of drops, chips or bar form) can be heated to alter its hardness characteristics. The heating may be carried out on the nut-like food composition by itself or on a food product which includes the nut-like food composition (e.g., in drop and/or chip form). Preferably, the nut-like food composition is heated at a sufficient temperature and for a sufficient amount of time to increase the hardness of the composition so that it has a maximum penetration force (see description in Ex. 6) of at least about 2,000 g. It is particularly desirable to harden the nut-like food composition so that it has a maximum penetration force of about 2,000 g to 10,000 g and, more desirably, to about 2,500 g to 6,000 g. After cooling to ambient temperature, the hardened nut-like food composition (e.g., in chip, drop or bar form) may be comminuted, such as by grinding, chopping and/or crushing, into smaller particles (e.g., circa 5,000 to 10,000 count/lb). This may be particularly useful when the nut-like food composition is to be used as a topping or used in place of ground nuts in producing a food product.

The nut-like food composition typically includes about 20 to 35 wt. %, more desirably about 24 to 31 wt. % of the triacylglycerol component, and, suitably, about 27 to 30 wt. % percent of the triacylglycerol component. At least a portion of the triacylglycerol component is normally formed by combining a lauric triacylglycerol with a saturated 16/18 triacylglycerol. Commonly known oils that would be considered lauric triacylglycerols include palm kernel oil, coconut oil, laurate canola oil (a genetically engineered canola oil having a fatty acid composition which includes at least about 35 wt. % lauric acid) and babassu oil. Palm kernel oil and fractionated and/or hydrogenated forms of palm kernel oil are particularly suitable lauric triacylglycerols for use in producing the present nut-like food composition. However, any oil or other composition, whether naturally occurring or not, would qualify as a lauric triacylglycerol if its fatty acid composition includes at least about 35 wt. % lauric acid. Usually, the lauric triacylglycerol makes up at least about 75 wt. % of the triacylglycerol component, and, preferably, the lauric triacylglycerol makes up at least about 85 wt. % of the triacylglycerol component. In some embodiments of the nut-like food composition, the lauric triacylglycerol may constitute about 90 wt. % or more of the triacylglycerol component.

The triacylglycerol component may also include a saturated 16/18 triacylglycerol. Suitable examples of saturated 16/18 triacylglycerols include highly hydrogenated forms of palm oil, cottonseed oil, soybean oil, corn oil, canola oil and the like. However, any other oil, whether naturally occurring or not, would qualify as a saturated 16/18 triacylglycerol if their fatty acid composition includes at least about 95 wt. % total palmitic acid and stearic acid. Typically, the Iodine Value of the saturated 16/18 triacylglycerol is very low, e.g., no more than 5 and more commonly no more than 2. Usually, the saturated 16/18 triacylglycerol makes up about 1.5 to 8 wt. % of the triacylglycerol component, and, preferably, about 2 to 6 wt. %.

The triacylglycerol component may also include other triacylglycerols not previously mentioned. Suitable examples of other triacylglycerols that may be included in the triacylglycerol component are triacylglycerols from milk, butter, lard, tallow, lard oil, whale oil, fish oil, cottonseed oil, and/or sunflower oil. Triacylglycerols from animals, such as milk, butter, lard, and/or tallow, can be particularly suitable for use in producing the nut-like food composition. However, any other suitable triacylglycerol may be used. Normally, the triacylglycerol component includes no more than about 25 wt. %, and, more desirably, no more than about 15 wt. % of triacylglycerols other than the lauric triacylglycerol and saturated 16/18 triacylglycerol. In some embodiments, the triacylglycerol component may be formed entirely from a mixture of the lauric triacylglycerol and the saturated 16/18 triacylglycerol.

The triacylglycerol component of the nut-like food composition may be characterized in terms of its fatty acid composition. The fatty acid composition of the triacylglycerol component commonly includes at least about 30 wt. % lauric acid and at least about 10 wt. % total of palmitic acid and stearic acid. The fatty acid composition may, however, include higher amounts of lauric acid such as: at least about 35 wt. %, or, more desirably, at least about 40 wt. % or at least about 50 wt. % lauric acid. The fatty acid composition typically includes about 10 to 22 wt. %, more desirably, about 10 to 20 wt. % of total palmitic and stearic acid and, suitably, about 12 to 18 wt. % total palmitic and stearic acid. In addition, the fatty acid composition may also include about 3 to 18 wt. %, more desirably about 5 to 12 wt. % and, preferably, about 5 to 8 wt. % oleic acid. The fatty acid composition may also include myristic acid, e.g., at least about 15 wt. % myristic acid. Examples of suitable triacylglycerol components can have a fatty acid composition which includes at least about 30 wt. % lauric acid; about 5 to 12 wt. % oleic acid; and about 10 to 20 wt. % total of palmitic acid and stearic acid. Other examples of suitable triacylglycerol components can have a fatty acid composition which includes at least about 40 wt. % lauric acid; about 5 to 8 wt. % oleic acid; at least about 15 wt. % myristic acid; and about 12 to 18 wt. % total of palmitic acid and stearic acid.

The nut-like food composition includes a bulking agent, which typically makes up a large portion of the composition, e.g., 50 wt. % or more of the total weight of the composition. Examples of suitable bulking agents include carbohydrates, protein-based materials, minerals and related mixtures. Whey powder, which is a mixture of materials including lactose, protein, lactic acid and ash, and non-fat milk solids, which are a mixture including casein and other proteins (e.g., serum proteins), lactose, minerals and vitamins, are examples of complex mixtures that can be used as bulking agents. Where a nut-like food composition is formed from a mixture including whole milk solids, the fat portion of the whole milk solids is considered to be part of the triacylglycerol component and the remainder ("non-fat milk solids") is considered to be part of the bulking agent. The bulking agent may also include table salt (sodium chloride) in an amount sufficient to achieve a desired flavor.

The bulking agent in the present nut-like food composition typically includes a saccharide component. The saccharide component can be a simple sugar (a monosaccharide), a disaccharide, a more complex carbohydrate or a mixture thereof. Specific examples of suitable saccharides include sucrose, lactose, polydextrose, maltodextrose, trehalose, and inulin. To provide a desirable sweet flavor, the nut-like food composition often includes sucrose, dextrose and/or lactose. The inclusion of an appropriate amount of dextrose can also influence the hardness characteristics achievable by the nut-like food composition on heating (e.g., via baking as part of a food product). To achieve nut-like food compositions that can be converted by heating into a material with a nut-like hardness and texture, it may be advantageous to include about 2 to 6 wt. % dextrose (based on the total weight of the composition) in a nut-like food composition. Measured in a different manner, where the nut-like food composition includes at least about 50 wt. % bulking agent, it may be advantageous to include about 3 to 10 wt. % dextrose (based on the total weight of the bulking agent) in a nut-like food composition. The present the nut-like food composition commonly includes at least about 50 wt. % of a saccharide component which includes about 3 to 10 wt. % dextrose (based on the total weight of the saccharide component).

It can be advantageous to include non-fat milk solids as part of the bulking agent. If the nut-like food composition is heated sufficiently (e.g., to a temperature of about 300° F. or higher), non-fat milk solids present in the composition can undergo a browning reaction and result in a change in coloration and appearance of the nut-like food composition. If a relatively large amount of non-fat milk solids is included in a nut-like food composition, it can contribute a noticeable milk flavor to the composition. Depending on the type of food product, this may or may not be a desirable attribute. When non-fat milk solids are included in the present nut-like food compositions, the amount is commonly chosen to be sufficient to lead to a browning of the composition while not contributing a noticeable milk flavor to the composition. It has been found that this can often be achieved in the present nut-like food compositions by including about 8 to 15 wt. % non-fat milk solids.

The nut-like food compositions may also include an emulsifier. The inclusion of the emulsifier will often lower the viscosity of the composition in comparison to a corresponding composition having a similar amount of triacylglycerol component but lacking the emulsifier. Examples of suitable emulsifiers include lecithin, monoglycerides, diglcerides, polyglycerol polyricinoleate ("PGPR") and mixtures thereof. When lecithin is employed as an emulsifier, it is often present as about 0.1 to 0.5 wt. % of the total weight of the composition (e.g., with nut-like food compositions that include about 20 to 35 wt. % of the triacylglycerol component).

The nut-like food compositions can also include other ingredients, such as flavorings and colorants. The nut-like food composition typically includes a nut flavoring related to the nut the particular composition may be attempting to mimic. Examples of nut flavorings include macadamia nut, walnut, pecan, almond, peanut, and pistachio flavorings. It is desirable that the nut flavoring be certified as being free of nut allergens. This is also true for the other ingredients used to produce the nut-like food composition, since a potential advantage of the present nut-like food composition is that, in contrast to nuts, it is commonly free of nut allergens that can cause allergic reactions. The nut-like food composition can also include cocoa powder. In addition to acting as a flavoring, cocoa powder can impart color to the composition.

Additional Illustrative Embodiments

A number of illustrative embodiments of the present nut-like food compositions are described below. The embodiments described are intended to provide illustrative examples of the food compositions and are not intended to limit the scope of the invention.

The nut-like food composition can include at least about 50 wt. % saccharide component, which includes dextrose, and about 24 to 31 wt. % of a triacylglycerol component. The triacylglycerol component can have a fatty acid composition including at least about 30 wt. % lauric acid and about 10 to 20 wt. % total of palmitic acid and stearic acid. The nut-like food composition can have a Macmichael viscosity at 120° F. of about 30 to 60 cP. The fatty acid composition of the triacylglycerol component desirably includes about 5 to 12 wt. % oleic acid.

The nut-like food composition can include a bulking agent and about 27 to 30 wt. % of a triacylglycerol component, which has a melting point of about 100 to 110° F. and a fatty acid composition including at least about 30 wt. % lauric acid. The fatty acid composition suitably includes about 5 to 8 wt. % oleic acid; at least about 15 wt. % myristic acid; at least about 40 wt. % lauric acid; and about 12 to 18 wt. % total of palmitic acid and stearic acid. The triacylglycerol component can commonly have a melting point of about 102 to 107° F.

The nut-like food composition can include a bulking agent and a triacylglycerol component having a fatty acid composition which includes about 5 to 12 wt. % oleic acid; at least about 30 wt. % lauric acid; and about 10 to 20 wt. % total of palmitic acid and stearic acid. Desirably, the fatty acid composition includes at least about 40 wt. % lauric acid. The triacylglycerol component preferably has a melting point of about 100 to 110° F. and, more desirably, about 102 to 107° F.

The nut-like food composition can include a triacylglycerol component having a fatty acid composition which includes at least about 40 wt. % lauric acid; about 5 to 8 wt. % oleic acid; at least about 15 wt. % myristic acid; and about 12 to 18 wt. % total of palmitic acid and stearic acid. This triacylglycerol component preferably has a melting point of about 102 to 107° F. The fatty acid composition can include about 50 wt. % or more lauric acid.

The nut-like food composition can include a saccharide component, which includes dextrose, and a triacylglycerol component which is formed by blending a mixture which includes at least about 80 wt. % of a lauric triacylglycerol and 1.5 to 8 wt. % of a saturated 16/18 triacylglycerol. Such a nut-like food composition can have a Macmichael viscosity at 120° F. of about 45 to 60 cP and a melting point of about 100 to 110° F.

The nut-like food composition can include at least about 50 wt. % of a saccharide component, which includes dextrose, and about 24 to 31 wt. % of a triacylglycerol component having a melting point of about 100 to 110° F. and a fatty acid composition including at least about 40 wt. % lauric acid. It may be possible to process nut-like food compositions meeting this description to provide a material having a maximum penetration force of at least about 2,000 g and, more desirably, about 2,500 g to 6,000 g.

The nut-like food composition can include a saccharide component, triacylglycerol component, non-fat milk solids and, optionally, an emulsifier such as lecithin. The nut-like food composition can be in the form of a material which desirably has a Macmichael viscosity at 120° F. of about 30 to 60 cP. In another form, the nut-like food composition can be processed by heating to form a harder composition, which has a maximum penetration force of about 2,000 g to 10,000 g and, more desirably, about 2,500 g to 6,000 g. In either instance, the nut-like food composition commonly includes a triacylglycerol component which has a fatty acid composition including at least about 40 wt. % lauric acid; about 5 to 12 wt. % oleic acid; and about 10 to 20 wt. % total of palmitic acid and stearic acid.

The nut-like food composition can include at least about 50 wt. % of a saccharide component, about 27 to 30 wt. % triacylglycerol component, about 8 to 15 wt. % non-fat milk solids and about 0.1 to 0.5 wt. % lecithin. The saccharide component can include about 2 to 6 wt. % dextrose based on the total weight of the composition. The triacylglycerol component can have a fatty acid composition including at least about 30 wt. % lauric acid; and about 10 to 20 wt. % total of palmitic acid and stearic acid. Commonly, the triacylglycerol component has a melting point of about 100 to 110° F. and, more desirably, about 102 to 107° F.

The nut-like food composition can include at least about 50 wt. % saccharide component, which includes about 3 to 10 wt. % dextrose (based on the total weight of the saccharide component), and about 27 to 30 wt. % of a triacylglycerol component. The triacylglycerol component can have a fatty acid composition including at least about 40 wt. % lauric acid, about 5 to 12 wt. % oleic acid and about 12 to 18 wt. % total of palmitic acid and stearic acid. An unbaked form of this nut-like food composition typically has a Macmichael viscosity at 120° F. of about 45 to 60 cP. The hardness of the nut-like food composition can be increased by heating for a sufficient amount of time (e.g., for about 10 minutes at about 375° F.) to increase the maximum penetration force of the composition to at least about 2,000 g and, more desirably, to about 2,500 g to 6,000 g.

The nut-like food composition can be incorporated into a food product, such as a baked product. Examples of baked products which can include the present nut-like food composition include muffins, cakes, cookies, brownies and other bar desserts, pies and soft pretzels.

Food products can include a nut-like food composition, which includes at least about 50 wt. % saccharide component and about 24 to 31 wt. % of a triacylglycerol component. The nut-like food composition typically has a maximum penetration force of at least about 2,000 g and, more desirably, about 2,500 g to 6,000 g. The triacylglycerol component can have a melting point of about 100 to 110° F. and a fatty acid composition which includes at least about 30 wt. % lauric acid. The saccharide component commonly includes dextrose, e.g., about 3 to 10 wt. % dextrose based on the total weight of the saccharide component.

The food product can include a nut-like food composition which includes bulking agent including about 2 to 6 wt. % dextrose (based on the total weight of the nut-like food composition) and about 24 to 31 wt. % of a triacylglycerol component. Typically, the triacylglycerol component includes at least about 75 wt. % of a lauric triacylglycerol, such as a fractionated and/or hydrogenated palm kernel oil, and about 1 to 10 wt. % of a saturated 16/18 triacylglycerol, such as a fully hydrogenated palm oil. The triacylglycerol component suitably has a melting point of about 100 to 110° F. and, more desirably, about 102 to 107° F. The nut-like food composition desirably has been processed to have a maximum penetration force of about at least about 2,000 g and, more desirably, about 2,500 g to 6,000 g.

The following examples are presented to illustrate the present invention and to assist one of ordinary skill in making and using the same. The examples are not intended in any way to otherwise limit the scope of the invention.

EXAMPLE 1

A nut-like food composition for use in baked products in place of nuts was formed using the following procedure. Initially, an oil blend was formed by melting the hydrogenated palm oil and mixing it with about 27% of the total fractionated palm kernel oil used in the final product. The amount of fractionated palm kernel oil as a percent of the final product is shown in Table 1. The composition of the resulting oil blend was approximately 14% hydrogenated palm oil and 86% fractionated palm kernel oil. The hydrogenated palm oil is available under the tradename Cote Hi™ stearine from Loders Croklaan, Channahon, Ill. Cote Hi™ stearine has a maximum iodine value of 5.0 and a capillary melting point of 136–144° F. The fractionated palm kernel oil is available under the tradename Cebes® 21-10 from Aarhus, Inc., Port Newark, N.J. Table 2 shows some of the properties and fatty acid composition of Cebes® 21-10 oil. The nut-like food composition contained 28.53 wt. % fat as a percentage of the total weight of the composition. The triacylglycerol component of the composition had a melting point of 105° F.

TABLE 1

Total Composition Of The Nut-Like Food Composition Of Example 1

| Ingredients | % Fat of Each Ingredient | % of Total Ingredients | % Fat of Total Fat |
|---|---|---|---|
| Sugar | 0 | 50.25 | — |
| Fractionated palm kernel oil | 100 | 27.14 | 95.1 |
| Hydrogenated palm oil | 100 | 1.14 | 4.0 |
| Nonfat dry milk solids | 0 | 12.58 | — |
| Dextrose | 0 | 3.70 | — |
| Lecithin | 100 | 0.23 | 0.8 |
| Nut flavoring | 0 | 0.038 | — |
| Salt | 0 | 0.90 | — |
| Natural cocoa powder | 11 | 0.105 | 0.37 |
| Lactose | 0 | 3.91 | — |

TABLE 2

Properties of Cebes ® 21-10 Oil

| Solid Fat Index | | Fatty Acid Composition (wt. %) | |
|---|---|---|---|
| 50° F. | 69–73 | Caprylic acid | 2.1 |
| 70° F. | 63–67 | Capric acid | 3.1 |
| 80° F. | 49–53 | Lauric acid | 55.4 |
| 92° F. | 1.0 max | Myristic acid | 21.0 |
| 100° F. | 0 | Palmitic acid | 8.5 |
| | | Stearic acid | 2.0 |
| Wiley melt point | 87–91° F. | Oleic acid | 6.9 |
| Iodine Value | 7–8 | Linoleic | 1.0 |

The oil blend was formed in a jacketed kettle with hot water flowing through the jacket. The oil blend was then combined with the remaining ingredients in Table 1 with the exception of the remaining 73% of the total fractionated palm kernel oil and the lecithin, which were not added at this point. These step should be performed in a heated vessel capable of maintaining the temperature of the mixture above the melting point of the oil blend. The contents of the vessel were mixed until a paste was formed. The paste was then processed through a three-roll refiner to compress any particles in the paste to approximately 38 microns in size. During this compressing step, the paste becomes a flake because the surface area that the oil adheres to increased as the average particle size decreased. The resulting flake material was then put back into the heated vessel and the remaining palm kernel oil and lecithin were added to produce a product with the desired fat content and viscosity. The product was then formed to the desired shape (e.g., drops of about 1,000 count/lb) and cooled in a cooling tunnel. The resulting nut-like food composition had a melting point of 104° F.

EXAMPLE 2

A nut-like food composition can be formed according to the method described in Example 1 using the ingredients shown in Table 3. The fractionated palm kernel oil (Cebes® 21-10 oil) and hydrogenated palm oil (Cote Hi™ stearine) were the same as employed in Example 1. The resulting nut-like food composition contained 28.68 wt. % fat as a percentage of the total weight of the composition.

TABLE 3

Total Composition of the Nut-Like Food Composition of Example 2

| Ingredients | % Fat of Each Ingredient | % of Total Ingredients | % Fat of Total Fat |
|---|---|---|---|
| Sugar | 0 | 56.9 | — |
| Fractionated palm kernel oil | 100 | 24.18 | 84.3 |
| Hydrogenated palm oil | 100 | 0.47 | 1.65 |
| Whole milk solids | 28.5 | 13.2 | 13.1 |
| Dextrose | 0 | 3.89 | — |
| Lecithin | 100 | 0.24 | 0.85 |
| Nut flavoring | 0 | 0.040 | — |
| Salt | 0 | 0.95 | — |
| Natural cocoa powder | 11 | 0.11 | 0.39 |

EXAMPLE 3

A nut-like food composition can be formed according to the method described in Example 1 using the ingredients shown in Table 4. The fractionated palm kernel oil (Cebes® 21-10 oil) and hydrogenated palm oil (Cote Hi™ stearine) were the same as employed in Example 1. The resulting nut-like food composition contained 28.53 wt. % fat as a percentage of the total weight of the composition. The triacylglycerol component of the composition had a melting point of 105° F.

TABLE 4

Total Composition of the Nut-Like Food Composition of Example 3

| Ingredients | % Fat of Each Ingredient | % of Total Ingredients | % Fat of Total Fat |
|---|---|---|---|
| Sugar | 0 | 54.16 | — |
| Fractionated palm kernel oil | 100 | 27.14 | 95.1 |
| Hydrogenated palm oil | 100 | 1.14 | 4.0 |
| Non-fat dry milk solids | 0 | 12.58 | — |
| Dextrose | 0 | 3.70 | — |
| Lecithin | 100 | 0.23 | 0.81 |
| Nut flavoring | 0 | 0.038 | — |
| Salt | 0 | 0.90 | — |
| Natural cocoa powder | 11 | 0.105 | 0.37 |

EXAMPLE 4

A nut-like food composition can be formed according to the method described in Example 1 using the ingredients shown in Table 5. The fractionated palm kernel oil (Cebes® 21-10 oil) and hydrogenated palm oil (Cote Hi™ stearine) were the same as employed in Example 1. The resulting nut-like food composition contained 28.53 wt. % fat as a percentage of the total weight of the composition. The triacylglycerol component of the composition had a melting point of 105° F.

TABLE 5

Total Composition of the Nut-Like Food Composition of Example 4

| Ingredients | % Fat of Each Ingredient | % of Total Ingredients | % Fat of Total Ingredients |
|---|---|---|---|
| Sugar | 0 | 45.1 | — |
| Fractionated palm kernel oil | 100 | 27.1 | 95.1 |
| Hydrogenated palm oil | 100 | 1.14 | 4.0 |
| Nonfat dry milk solids | 0 | 12.6 | — |
| Dextrose | 0 | 3.7 | — |

TABLE 5-continued

Total Composition of the Nut-Like Food Composition of Example 4

| Ingredients | % Fat of Each Ingredient | % of Total Ingredients | % Fat of Total Ingredients |
|---|---|---|---|
| Lecithin | 100 | 0.23 | 0.81 |
| Nut flavoring | 0 | 0.038 | — |
| Salt | 0 | 0.90 | — |
| Natural cocoa powder | 11 | 0.105 | 0.37 |
| Lactose | 0 | 9.0 | — |
| Total | | 100 | 28.53% |

EXAMPLE 5

Baked Cookie Including the Nut-Like Food Composition

Cookies including the nut-like food composition can be formed according to the following method. Table 6 shows ingredients which can be used to make cookies. The flour, baking powder and salt are sifted together and set aside. The butter, brown sugar and white sugar are creamed together until smooth. The egg and vanilla extract are then added to the creamed butter/sugar mixture and the resulting mixture is beaten for two minutes. The sifted ingredient mixture is then added gradually and the resulting dough is beaten on low speed for one minute. The cocoa butter drops and nut-like chips are folded into the mixture to form a cookie dough. Teaspoon size drops of the cookie dough are placed onto an ungreased Teflon™ cookie sheet and the cookie dough is baked for about 10 minutes at 375° F. to form the final cookie products.

TABLE 6

Composition of a Cookie Including a Nut-Like Food Composition

| Ingredients | Amount of Ingredients | Wt. % of Total Ingredients |
|---|---|---|
| Flour | 239.7 g | 23.26 |
| Baking Powder | 2.63 g | 0.26 |
| Salt | 2.25 g | 0.22 |
| Brown Sugar | 166.13 g | 16.12 |
| White Sugar | 72.6 g | 7.04 |
| Butter | 169.5 g | 16.45 |
| Egg | 47.5 g | 4.61 |
| Vanilla Extract | 2.26 g | 0.22 |
| Cocoa Butter Drops (1,000 count/lb) | 164 g | 15.9 |
| Nut-Like Chips (1,000 count/lb) | 164 g | 15.9 |

EXAMPLE 6

Texture Analysis

Texture analysis was used to evaluate the hardness characteristics of the nut-like food composition of Example 1 in an unbaked and baked state (baked in a cookie batter according to the procedure described in Example 5). Macadamia nuts baked in cookies according to the same procedure and unbaked Nestle's® white chocolate bits were also analyzed for comparison purposes. Samples of the bits or nuts were prepared for analysis by cutting the bit/nut with a razor blade to form a slice with two parallel surfaces spaced 4 to 6 mm apart. The bit/nut slice was then placed on the texture analyzer (used in a penetrometer configuration) so that the object sat on a solid flat base and there was a solid flat surface on top. Since the area of this upper flat surface was variable, a relatively small probe (1 mm in diameter) was used. The diameter of the probe was always significantly smaller than the upper flat surface of the slice being analyzed. As noted above, the thickness of these objects was always 4 to 6 mm.

The texture analyzer was set so that the probe approached the slice at 2 mm/second until a 5 g trigger force was achieved. Data recording was initiated at this point and the probe speed was changed to 0.5 mm/second for the remainder of the analysis. The probe was advanced at 0.5 mm/second until the probe had advanced 2.0 mm beyond the trigger point. During the data recording period, the force (in grams) required to advance the probe was measured as a function of penetration distance. The maximum value applied during this process is referred to herein as the "maximum penetration force".

Figure 2:
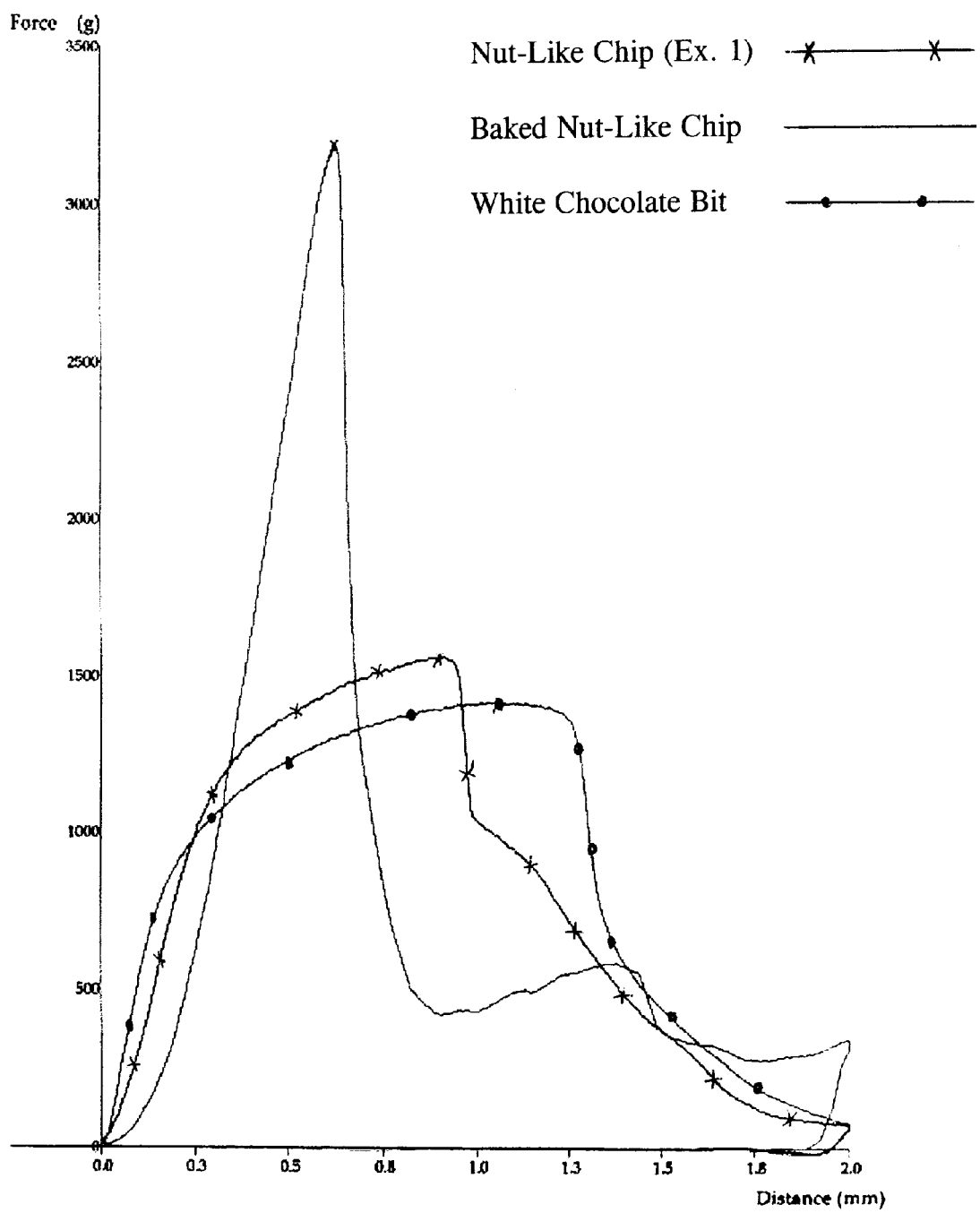
FIG. 2 shows a graph of the probe force (in grams) as a function of penetration distance from a texture analysis (in a penetrometer configuration) for a white chocolate bit, a nut-like food composition prepared according to Example 1, and a baked form of the same nut-like food composition.

FIGS. 1 and 2 show comparisons of typical profiles for slices of unbaked nut-like food composition of Example 1 and slices of the present nut-like food composition ("nut-like chips" of Ex. 2) after baking in a cookie according to the procedure described in Example 5. FIG. 1 includes a typical profile for macadamia nuts (baked in cookies according to the procedure described in Example 5) for comparison purposes. FIG. 2 includes a profile for unbaked Nestle's® white chocolate bits for comparison purposes.

The unbaked nut-like chips, white chocolate bits and macadamia nuts generally had similar yield forces and profiles. The unbaked nut-like chips and white chocolate bits each exhibited force profiles which increased over the first 0.3 to 0.5 mm penetration and then essentially plateaued for much of the remainder of the analysis (with a maximum penetration force of about 1,000 to 1,500 g). The macadamia nut scans exhibited a more jagged profile which was similar in shape, increasing over the first 0.3 to 0.5 mm penetration and then plateauing for much of the remainder of the analysis. As observed with the unbaked nut-like chips and white chocolate bits, the maximum penetration force for the baked macadamia nut slices ranged from about 1,000 to 1,600 g. The macadamia nut slices from cookies prepared according to the procedure described in Example 5 and those cookies purchased from a store (data not shown) had similar profiles. Slices of the present baked nut-like food composition chip (prepared according to Example 5) exhibited a more brittle response. The texture analysis profiles had an initial spike up to a maximum penetration force of about 3,00 to 4,500 g, followed by a drop in penetration force due to fracture.

EXAMPLE 7

Viscosity Analysis

The Macmichael viscosity of the nut-like food composition prepared according to the procedure described in Example 1 can be obtained as follows. The apparatus needed to determine the Macmichael viscosity includes: (1) a Machmichael viscometer that has a seven centimeter rotational cup, a two centimeter bob, and a #22 certified wire, (2) a temperature controlled case, (3) an electric water bath, (4) a thermometer, (5) a spatula, (6) a metric ruler, and (7) an electric fan.

Before performing the actual viscosity measurement, the sample must be prepared as follows. The sample should be melted and poured into a preheated MacMichael cup to approximately the 30 mm level. The thermometer is inserted into the sample as the sample is stirred. Care must be taken to make sure the sides of the cup are scraped during stirring. The Macmichael cup containing the sample and thermometer is then placed into a 140–145° F. water bath. The sample is stirred occasionally until the temperature is 130° F. When reading the temperature, the thermometer should be raised from the bottom of the cup. The Macmichael cup is then removed from the water bath, and the sample is cooled to 120° F. Cooling of the sample may be accomplished faster by frequent stirring and the use of the electric fan.

After preparing the sample, the viscosity is measured according to the following procedure. Initially, the Macmichael viscometer must be properly zeroed and timed. The documentation included with the viscometer explains how this is done. After rechecking the temperature of the sample to ensure it is still 120° F., remove the thermometer and place the Macmichael cup containing the sample into the rotational cup of the viscometer. After raising the pointer to an upright position, insert the two centimeter bob into the sample and place the spindle containing #22 wire in a vertical position. Fix the triangle at the upper part of the wire between the attachment pins, with the flat face of the triangle placed against the flat face of the support. Position the metal collar support in place, and lower the pointer so that its position over the dial may be read. After turning off the fan in the temperature controlled case, turn the viscometer on and begin rotation. Once the dial stops moving, read the position of the pointer over the dial. This is the uncorrected viscosity measurement. Remove the spindle and bob from the sample, and determine the exact height of the sample on the bob by measuring (in mm) a straight line along the length of the bob. When "over" use the lowest point, when "under" use the lowest point of the sample on the bob with respect to the 30 mm line. Using the height of the sample as measured previously, correct the viscosity using the following equation:

$$\text{Viscosity} = \frac{30.0 \text{ mm}}{\text{Measured height of the sample}} \cdot \text{Dial reading}$$

The invention has been described with reference to various specific and illustrative embodiments and techniques. However, it should be understood that many variations and modifications may be made while remaining within the spirit and scope of the invention.

What is claimed is:

1. A food composition comprising:
    at least about 50 wt. % saccharide component, which includes dextrose;
    about 24 to 31 wt. % triacylglycerol component having a melting point of about 100 to 110° F. and a fatty acid composition including at least about 30 wt. % lauric acid and about 10 to 20 wt. % total of palmitic acid and stearic acid; and
    wherein the food composition has a Macmichael viscosity at 120° F. of about 30 to 60 cP.

2. The food composition of claim 1 comprising:
    about 27 to 30 wt. % of the triacylglycerol component, wherein the triacylglycerol component has a melting point of about 102 to 107° F., and the fatty acid composition includes at least about 40 wt. % lauric acid.

3. The food composition of claim 1 further comprising about 8 to 15 wt. % non-fat milk solids; and about 0.1 to 0.5 wt. % lecithin.

4. The food composition of claim 1 further comprising nut flavoring.

5. The food composition of claim 1 wherein the fatty acid composition includes at least about 40 wt. % lauric acid and further comprises about 5 to 12 wt. % oleic acid.

6. The food composition of claim 1 where the saccharide component includes about 3 to 10 wt. % dextrose based on a total weight of the saccharide component.

7. The food composition of claim 1 wherein the fatty acid composition includes at least about 50 wt. % of the lauric acid.

8. The food composition of claim 1 where the triacylglycerol component has a melting point of about 102 to 107° F.

9. The food composition of claim 1 wherein the triacylglycerol component has an Iodine Value of no more than about 10.

10. The food composition of claim 1 further comprising an emulsifier.

11. The food composition of claim 1 further comprising non-fat milk solids.

12. The food composition of claim 1 wherein the saccharide component further comprises sucrose and lactose.

13. The food composition of claim 1 further comprising cocoa powder.

14. The food composition of claim 1 wherein the triacylglycerol component has a melting point of about 102 to 107° F.; and the fatty acid composition includes at least about 40 wt. % lauric acid; about 12 to 18 wt. % total of palmitic acid and stearic acid; and further comprises about 5 to 8 wt. % oleic acid; and at least about 15 wt. % myristic acid.

15. The food composition of claim 1, wherein the food composition is substantially free of nut allergens.

16. A food composition comprising:
    at least about 50 wt. % of a saccharide component, which includes dextrose; and
    about 24 to 31 wt. % of a triacylglycerol component having a melting point of about 100 to 110° F.; and comprising at least about 80 wt. % of a lauric triacylglycerol and about 1.5 to 8 wt. % of a saturated 16/18 triacylglycerol;
    wherein the food composition has a Macmichael viscosity at 120° F. of about 30 to 60 cP.

17. The food composition of claim 16 further comprising about 8 to 15 wt. % non-fat milk solids; and about 0.1 to 0.5 wt. % lecithin.

18. The food composition of claim 16 wherein the triacylglycerol component has an Iodine Value of no more than about 10.

19. The food composition of claim 16 wherein the saccharide component further comprises sucrose and lactose.

20. A food composition comprising:
    at least about 50 wt. % saccharide component, which includes dextrose; and
    about 24 to 31 wt. % triacylglycerol component having a melting point of about 100 to 110° F. and a fatty acid composition including at least about 30 wt. % lauric acid and about 10 to 20 wt. % total of palmitic acid and stearic acid;
    wherein said food composition has a maximum penetration force of at least about 2,000 g.

21. The food composition of claim 20 having a maximum penetration force of about 2,500 g to 6,000 g.

22. The food composition of claim 20 wherein the fatty acid composition further comprises about 5 to 12 wt. % oleic acid.

23. The food composition of claim 20 comprising about 27 to 30 wt. % of the triacylglycerol component.

24. The food composition of claim 20 further comprising:
about 8 to 15 wt. % non-fat milk solids; and
about 0.1 to 0.5 wt. % lecithin.

25. The food composition of claim 20 wherein the fatty acid composition includes at least about 50 wt. % of the lauric acid.

26. The food composition of claim 20 wherein the triacylglycerol component has an Iodine Value of no more than about 10.

27. The food composition of claim 20 further comprising an emulsifier.

28. The food composition of claim 20 further comprising non-fat milk solids.

29. The food composition of claim 20 wherein the saccharide component further comprises sucrose and lactose.

30. The food composition of claim 20 wherein the triacylglycerol component has a melting point of about 102 to 107° F.; and the fatty acid composition includes at least about 40 wt. % lauric acid; about 12 to 18 wt. % total of palmitic acid and stearic acid; and further comprises about 5 to 8 wt. % oleic acid; and at least about 15 wt. % myristic acid.

31. The food composition of claim 20, wherein the food composition is substantially free of nut allergens.

32. A food comprising:

at least about 50 wt. % saccharide component, which includes about 3 to 10 wt. % dextrose; and about 24 to 31 wt. % triacylglycerol component having a melting point of about 102 to 107° F. and a fatty acid composition including at least about 30 wt. % lauric acid; about 10 to 20 wt. % total of palmitic acid and stearic acid; about 5 to 12 wt % oleic acid; and at least about 15 wt. % myristic acid;

wherein the food composition has a Macmichael viscosity at 120° F. of about 30 to 60 cP.

33. The food composition of claim 32, wherein the food composition is substantially free of nut allergens.

34. A food composition comprising:

at least about 50 wt. % saccharide component, which includes about 3 to 10 wt. % dextrose; and about 24 to 31 wt. % triacylglycerol component having a melting point of about 102 to 107° F. and a fatty acid composition including at least about 30 wt. % lauric acid; about 10 to 20 wt. % total of palmitic acid and stearic acid; about 5 to 12 wt % oleic acid; and at least about 15 wt. % myristic acid;

wherein the food composition has a maximum penetration force of about 2,000 g to 10,000 g.

35. The food composition of claim 34, wherein the food composition is substantially free of nut allergens.

* * * * *

UNITED STATES PATENT AND TRADEMARK OFFICE
CERTIFICATE OF CORRECTION

PATENT NO.   : 6,605,309 B2
DATED        : August 12, 2003
INVENTOR(S)  : Mark D. Freeman et al.

It is certified that error appears in the above-identified patent and that said Letters Patent is hereby corrected as shown below:

Column 15,
Line 25, please insert -- composition -- after "food"
Line 27, please insert -- based on the total weight of the saccharide component -- after "dextrose".

Signed and Sealed this

Eighteenth Day of May, 2004

JON W. DUDAS
*Acting Director of the United States Patent and Trademark Office*